United States Patent [19]

Taghezout et al.

[11] Patent Number: 5,734,215
[45] Date of Patent: Mar. 31, 1998

[54] ELECTROMECHANICAL TRANSDUCER COMPRISING TWO ROTORS

[75] Inventors: Daho Taghezout, Saint-Sulpice; Yves Guérin, Grenchen, both of Switzerland

[73] Assignee: Eta SA Fabriques d'Ebauches, Grenchen, Switzerland

[21] Appl. No.: 519,647

[22] Filed: Aug. 25, 1995

[30] Foreign Application Priority Data

Aug. 26, 1994 [CH] Switzerland .................. 02 618/94

[51] Int. Cl.$^6$ .................. H02K 1/12; H02K 37/00
[52] U.S. Cl. .................. 310/114; 310/40 MM; 310/49 R; 310/162
[58] Field of Search .................. 310/114, 49 R, 310/156, 40 MM, 162, 165, 216, 83, 179; 368/157, 160, 161, 162; 318/696, 685

[56] References Cited

U.S. PATENT DOCUMENTS

| | | | |
|---|---|---|---|
| 4,546,278 | 10/1985 | Xuan | 310/49 R |
| 4,563,604 | 1/1986 | Xuan | 310/49 R |
| 5,028,857 | 7/1991 | Taghezout | 318/696 |
| 5,302,875 | 4/1994 | Taghezout | 310/156 |
| 5,321,330 | 6/1994 | Taghezout | 310/257 |
| 5,444,368 | 8/1995 | Horber | 324/207 |

FOREIGN PATENT DOCUMENTS

| | | |
|---|---|---|
| 143227 | 9/1983 | European Pat. Off. . |
| 92521 | 10/1983 | European Pat. Off. . |
| 217164 | 4/1987 | European Pat. Off. . |
| 393606 | 10/1990 | European Pat. Off. . |

Primary Examiner—Thomas M. Dougherty
Assistant Examiner—Tran N. Nguyen
Attorney, Agent, or Firm—Sughrue, Mion, Zinn, Macpeak & Seas, PLLC

[57] ABSTRACT

An electromechanical transducer (1), in particular a motor used in timepieces, having a stator (2) and two rotors (14 and 15). The two rotors (14 and 15) are situated respectively in two stator holes (4 and 6) each defined by three stator poles (8a, 10a, 12a; 8b, 10b, 12b). The transducer (1) is capable of functioning as a stepping motor, each of the two rotors being capable of rotating in the two possible rotational directions independently of the other rotor.

5 Claims, 6 Drawing Sheets

ELECTROMECHANICAL TRANSDUCER COMPRISING TWO ROTORS

FIELD OF THE INVENTION

The present invention concerns an electromechanical transducer comprising two rotors, notably a motor of the type used in timepieces.

SUMMARY OF THE INVENTION

An aim of the present invention is to provide an electromechanical transducer, notably of the type used in timepieces, comprising two rotors capable of being independently controlled of each other in a relatively easy manner in both possible rotation directions.

The present invention thus concerns an electromechanical transducer comprising:

a stator defining a first stator hole and a second stator hole, a first rotor and a second rotor rotatably mounted and traversing respectively the first and second stator holes, each of these first and second rotors comprising a permanent magnet magnetically coupled to said stator.

This electromechanical transducer is characterised in that each of its first and second stator holes is defined by a first stator pole, a second stator pole and a third stator pole, said first and second stator poles partially defining the first stator hole being magnetically coupled by first means for guiding the magnetic flow, the first and second stator poles partially defining the second stator hole being magnetically coupled by second means for guiding the magnetic flow. The first and second magnetic flow guiding means are coupled respectively with first and second magnetic supply means, the two third stator poles being magnetically coupled to a first end of a stator arm whose second end is magnetically coupled to said first and second magnetic flow guiding means, said stator arm being coupled with third magnetic supply means.

In accordance with other features of the electromagnetic transducer according to the invention, the permanent magnet of each of the two rotors is bipolar with radial magnetisation defining a magnetic axis of this permanent magnet, the permanent magnets of the first and second rotors being respectively positioned inside the first and second stator holes.

Further, in order to enable control in a stepping mode of the electromechanical transducer according to the invention, positioning notches are provided on the edge of the first and second stator holes defining two minimum energy positions staggered at an angle of 180° for the permanent magnet of each of the first and second rotors.

According to a preferred embodiment of the invention, the electromechanical transducer is also arranged so that, when one of the permanent magnets is in one of its aforementioned two minimum energy positions, the direction of the magnetic axis of this permanent magnet is aligned with the second stator pole partially defining the stator hole in which this permanent magnet is housed.

According to a particular embodiment of the invention, the first, second and third magnetic supply means are formed respectively by first, second and third coils.

It follows from the features of the above described preferred embodiment that it is easy to control independently each of the two rotors of the electromechanical transducer according to the invention in both possible rotational directions with the aid of a control method which is also an object of the present invention.

This control method according to the invention is characterised in that all that is provided for driving the first rotor in rotation in a first rotational direction, while leaving the second rotor in one of its two minimum energy positions, is only the supply of the first magnetic supply means with an alternation of the polarity of the supply current provided to these first magnetic supply means and, in a second rotational direction, all that is provided is the supply of the third magnetic supply means, with an alternation in the polarity of the supply current provided to these third magnetic supply means, jointly with the supply of the second magnetic supply means so that the magnetic flow, resulting from the supply of these second and third magnetic supply means and acting on the second rotor, has a global propagation direction, inside the volume defined by the permanent magnet of this second rotor, substantially parallel to the direction of the magnetic axis of this permanent magnet when the latter is positioned in one of its two minimum energy positions.

As a result of the aforementioned electromechanical transducer and the control method, an electromechanical transducer is provided comprising two rotors able to be controlled independently of each other in both possible rotational directions with the aid of only three magnetic supply means, in particular three coils.

Other features and advantages of the present invention will be better described with the aid of the following description made with reference to the attached drawings, given purely by way of non limiting example, in which:

DESCRIPTION OF PREFERRED EMBODIMENT

Figure 1:
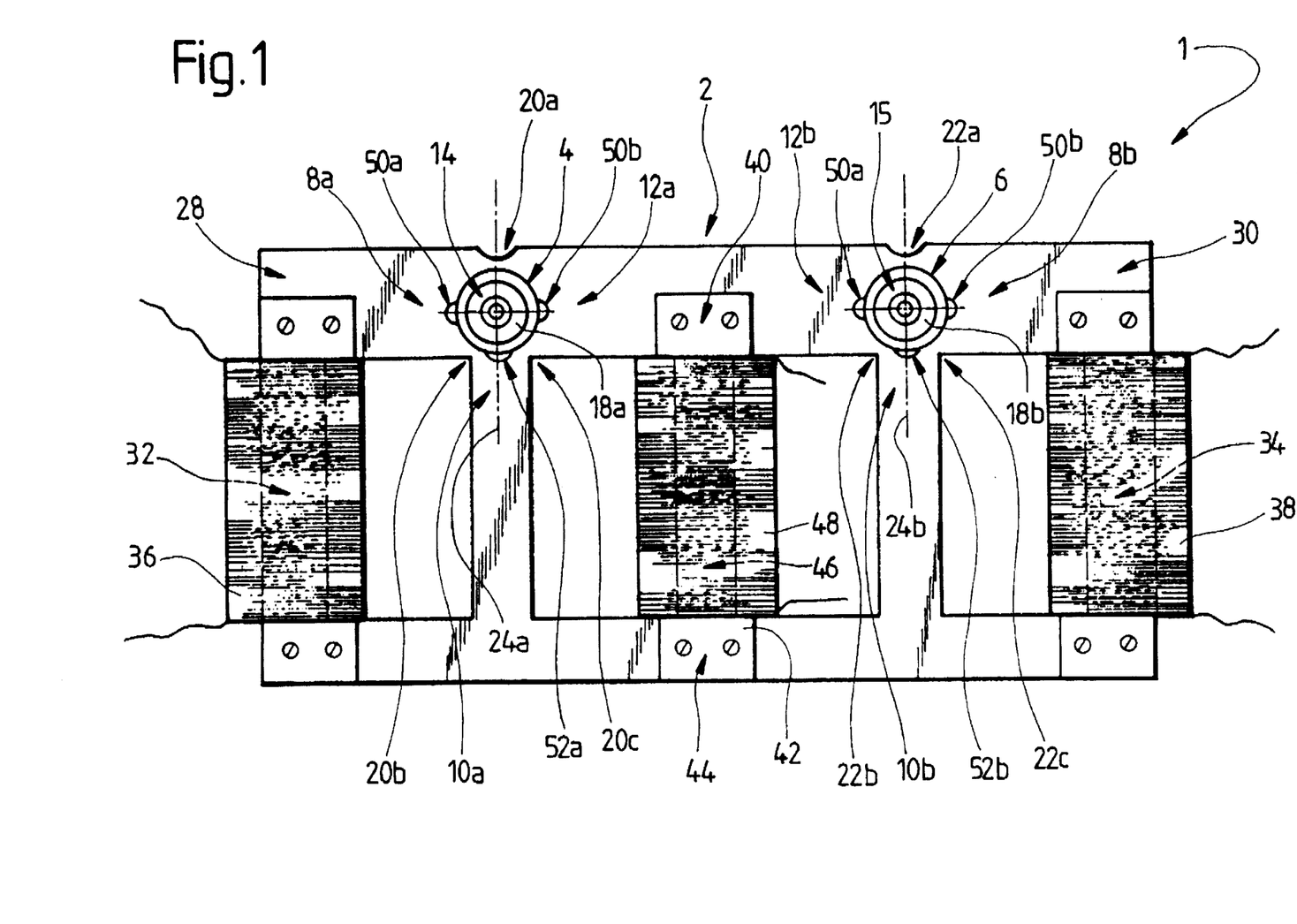
FIG. 1 is a top view of a first embodiment of an electromechanical transducer according to the invention.

Referring to FIG. 1, a first embodiment of an electromechanical transducer according to the invention will be described.

In said FIG. 1, the electromechanical transducer 1 comprises a stator 2 defining a first stator hole 4 and a second stator hole 6. More particularly, each of these first and second stator holes 4 and 6 is defined by a first stator pole 8a, 8b, a second stator pole 10a, 10b and a third stator pole 12a, 12b.

Electromechanical transducer 1 also comprises a first rotor 14 and a second rotor 15 traversing respectively first stator hole 4 and second stator hole 6. Each of these first and second rotors 14 and 15 comprises a permanent magnet 18a, 18b situated inside the respective stator hole 4,6, permanent magnets 18a and 18b being thus magnetically coupled to stator 2.

The three stator poles 8a, 10a and 12a are magnetically insulated from each other by areas of high magnetic reluctance forming necks 20a, 20b and 20c. Likewise, the three stator poles 8b, 10b and 12b are magnetically insulated from each other by areas of high magnetic reluctance forming necks 22a, 22b and 22c. The first and second stator poles respectively 8a and 12a, 8b and 12b, define an angle at the centre of rotor 14, 15 of around 135°. The second stator pole 10a, respectively 10b, defines an angle at the centre of rotor 14, respectively 15, of around 90°. In an alternative embodiment (not shown), each of stator poles 8a, 8b, 10a, 10b, 12a and 12b define an angle at the centre of 120°.

The particular arrangement of the stator poles defining stator holes 4 and 6 defines an axial symmetry in the plane of the stator for each of the two areas respectively surrounding stator holes 4 and 6, the axis of the axial symmetry being designated by the reference 24a, 24b respectively. Permanent magnets 18a and 18b are bipolar with radial magnetisation and thus each possess a magnetic axis 26a, 26b (shown in FIGS. 2 to 9). In light of this and given the aforementioned axial symmetry, each of these permanent magnets 18a and 18b possess two minimum energy positions when the transducer is not supplied with current. Magnetic axes 26a and 26b of these two permanent magnets 18a and 18b have directions respectively parallel to symmetry axes 24a and 24b when each of permanent magnets 18a and 18b is in one of its two minimum energy positions.

First stator pole 8a and second stator pole 10a are magnetically coupled to each other by magnetic flow guiding means 28 Likewise, first stator pole 8b and second stator pole 10b are magnetically coupled to each other by magnetic flow guiding means 30. Magnetic flow guiding means 28 and 30 form respectively a first magnetic circuit and a second magnetic circuit of the electromechanical transducer.

Magnetic flow guiding means 28 and 30 comprise respectively a core 32 and a core 34 around which are wound respectively a first coil 36 and a second coil 38. Third poles 12a and 12b are magnetically connected to a first end 40 of a stator arm 42 of low magnetic reluctance. The second end 44 of this stator arm 42 is magnetically coupled to first magnetic flow guiding means 28 and also to second magnetic flow guiding means 30. Stator arm 42 comprises a core 46 around which a coil 48 is wound.

It will be noted that, in an advantageous manner, two positioning notches 50a and 50b diametrically opposite each other in relation to symmetry axis 24a and 24b are provided on the edge of each of the two stator holes 4 and 6. These positioning notches 50a and 50b are used to generate a positioning torque of permanent magnet 18a, 18b.

It will also be noted that magnetic axis 26a, 26b of permanent magnet 18a, 18b is aligned with second stator pole 10a, 10b when rotor 14, 15 is in one of its two minimum energy positions.

In FIG. 1 another notch 52a, 52b has been provided on the edge of stator hole 4,6. This notch is used to balance the attraction forces exerted on permanent magnet 8a, 18b by stator poles 8a, 10a and 12a, and 8b, 10b, 12b respectively. It will be noted that a notch of this type is not essential for the proper operation of the electromechanical transducer according to the invention.

Referring henceforward to FIGS. 2 to 9, a control method according to the invention for the above described electromechanical transducer will now be described. FIGS. 2 to 9 are schematic diagrams of the electromechanical transducer of FIG. 1 in which the whole of stator 2 is shown in projection in a single identical plane, while the stator of electromechanical transducer 1 of FIG. 1 extends essentially in two parallel planes to enable cores 32, 34 and 46 respectively carrying coils 36, 38 and 48 to be fixed to the remaining part of the stator.

This simplified schematic diagram of electromechanical transducer 1 of FIG. 1 is advantageous for describing clearly and correctly the magnetic functioning of this electromechanical transducer when the latter is controlled in accordance with the control method which will now be described.

The control method according to the invention enables each of the two rotors 14 and 15 of electromechanical transducer 1 (FIG. 1) to be independently controlled in both possible rotational directions. FIGS. 2 to 9 show only permanent magnets 18a and 18b belonging respectively to the two rotors 14 and 15. Magnetic axis 26a of bipolar permanent magnet 18a is represented by a first arrow and magnetic axis 26b of bipolar permanent magnet 18b is represented by a second arrow.

Only the references needed for the description of the control method according to the invention have been mentioned in FIGS. 2 to 9. The references already described during the description of FIG. 1 will not be described again here in detail.

Figure 2:
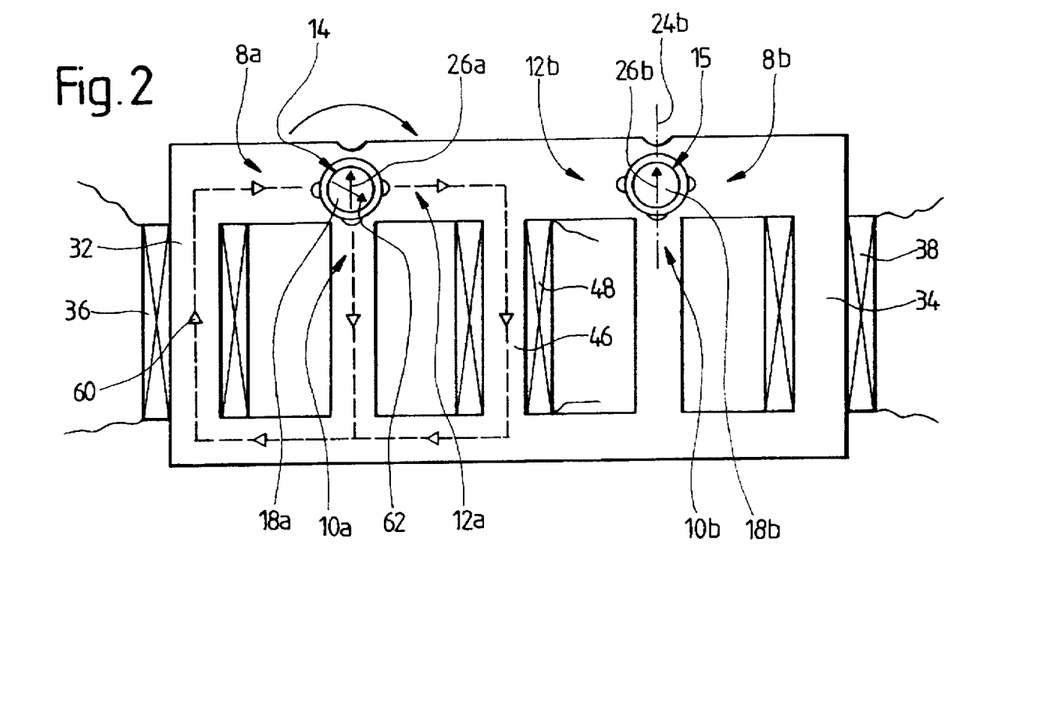
FIGS. 2 to 9 are schematic diagrams of the transducer of FIG. 1 used to explain the magnetic operation of this transducer controlled according to the control method of the present invention.
Figure 3:
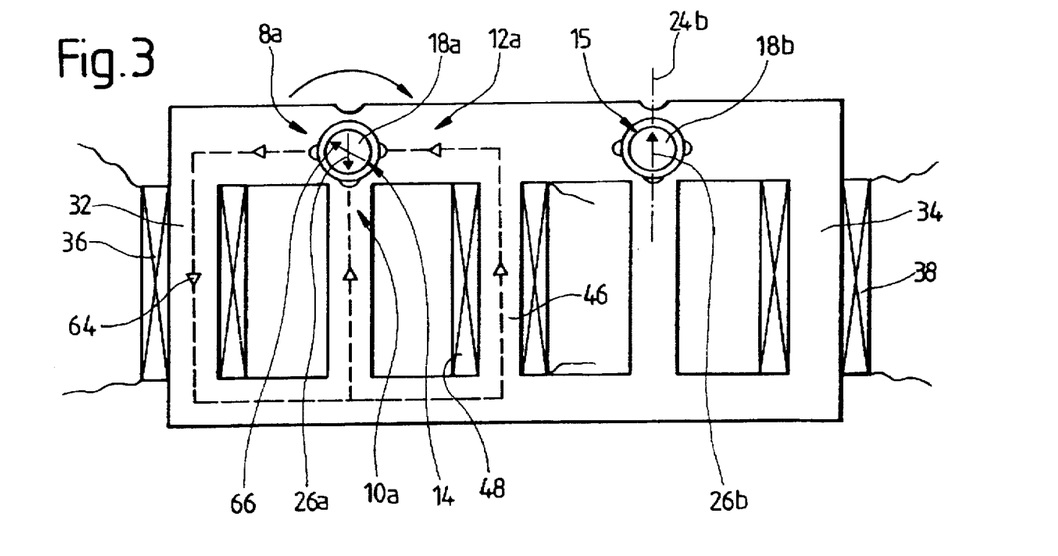

FIGS. 2 and 3 show schematically the control method for driving only rotor 14 in rotation in the negative direction, while leaving rotor 15 in one of its two minimum energy positions.

"Negative direction" for the rotation of a rotor, is used to mean a rotation in a clockwise direction. Thus, "positive direction" of rotation, is used below to mean a rotation in an anticlockwise direction.

In order to drive rotor 14 from the first minimum energy position in which it is shown in FIG. 2 to its second minimum energy position in which it is shown in FIG. 3, coil 36 is supplied with the aid of a supply current having a first polarity so as to generate in core 32 a magnetic flow 60. This magnetic flow 60 generated by coil 36 enters the volume defined by permanent magnet 18a via first magnetic pole 8a to exit again in substantially equal parts via second and third stator poles 10a and 12a.

The global propagation direction of magnetic flow 60 in the volume defined by permanent magnet 18a corresponds substantially to the direction represented in FIG. 2 by arrow 62. Magnetic flow 60 traversing permanent magnet 18a thus generates a torque on this permanent magnet 18a so as to drive it in rotation to its second minimum energy position.

Then in order to drive rotor 14, again in the negative direction, from its second minimum energy position shown in FIG. 3 to the first minimum energy position shown in FIG. 2, coil 36 is supplied with a supply current having a second polarity opposite to said first polarity. This supply provides a magnetic flow 64 in core 32. This magnetic flow 64 propagates in the stator to reach the volume defined by permanent magnet 18a, in substantially equal parts, from second and third stator poles 10a and 12a and to exit again from this volume via first stator pole 8a.

The global propagation direction of magnetic flow 64 traversing the volume defined by permanent magnet 18a is represented in FIG. 3 by arrow 66. Magnetic flow 64 traversing permanent magnet 18a generates a torque on this permanent magnet 18a used to turn rotor 14 from the second minimum energy position shown in FIG. 3 to the first minimum energy position shown in FIG. 2.

Thus, by supplying coil 36 with a supply current having an alternating polarity, it is possible to turn rotor 14 by steps of 180° in a negative rotational direction, without driving rotor 15 in rotation.

The fact that rotor 15 is not driven in rotation simultaneously with rotor 14 is due to the arrangement of the stator of the electromechanical transducer according to the invention. No principal magnetic circuit traverses the volume defined by permanent magnet 18b of rotor 15 when coil 36 is supplied. Only negligible secondary magnetic flows traverse permanent magnet 18b given the high magnetic permeability of stator arm 42.

It is to be noted here FIGS. 2 to 9 show only the propagations in the principal magnetic circuits of any magnetic flow, generated by one of the three coils 36, 38 and 48, with the aid of dotted lines and arrows indicating the propagation direction of this magnetic flow.

Figure 4:
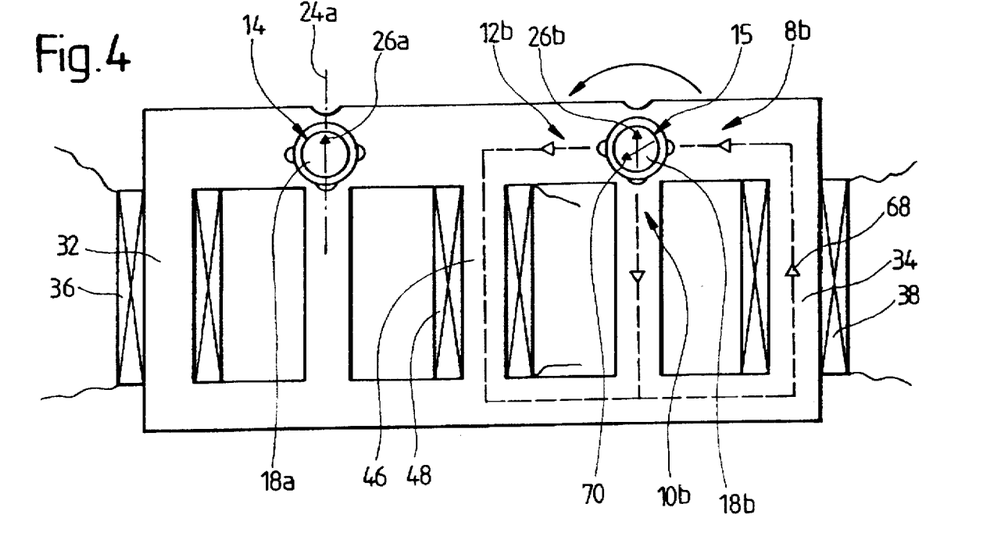
Figure 5:
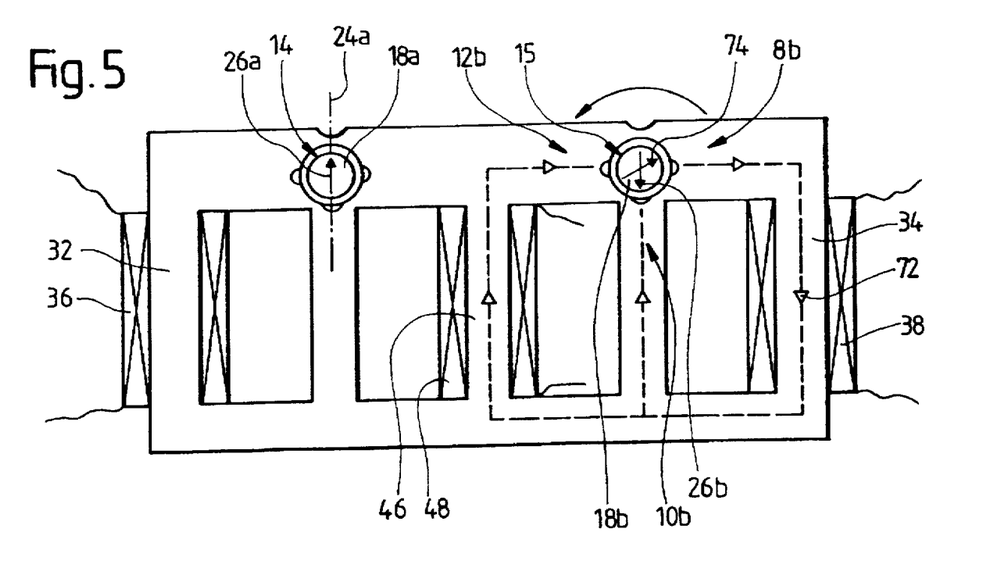

As the electromechanical transducer according to the invention has a symmetry, it follows that the driving of rotor 15 in rotation in a positive direction is carried out in a similar manner to the driving of rotor 14 in rotation in a negative direction, which is shown in FIGS. 4 and 5.

FIGS. 4 and 5 show schematically the control method for driving only rotor 15 in rotation in the positive direction, while leaving rotor 14 in one of its two minimum energy positions.

In order to drive rotor 15 from its first minimum energy position in which it is shown in FIG. 4 to its second minimum energy position in which it is shown in FIG. 5, coil 38 is supplied with a supply current having a first polarity so as to generate a magnetic flow 68 in core 34 of this coil 38. This magnetic flow 68 enters the volume defined by permanent magnet 18b via first stator pole 8b and exits again from this volume in substantially equal parts via second and third stator poles 10b and 12b. The global direction of magnetic flow 68 traversing permanent magnet 18b is represented by arrow 70.

Then, in order to drive rotor 15 in rotation from its second minimum energy position to its first minimum energy position, coil 38 is supplied with a supply current having a second polarity opposite to said first polarity so as to generate a magnetic flow 72 in core 34. This magnetic flow 72 enters the volume defined by permanent magnet 18b, in substantially equal parts via second and third stator poles 10b and 12b to exit again via first stator pole 8b. The global direction of the magnetic flow traversing permanent magnet 18b of rotor 15 is represented in figure 5 by arrow 74.

Magnetic flows 68 and 72 traversing permanent magnet 18b generate alternatively a torque driving rotor 15 in rotation by 180° steps.

Figure 6:
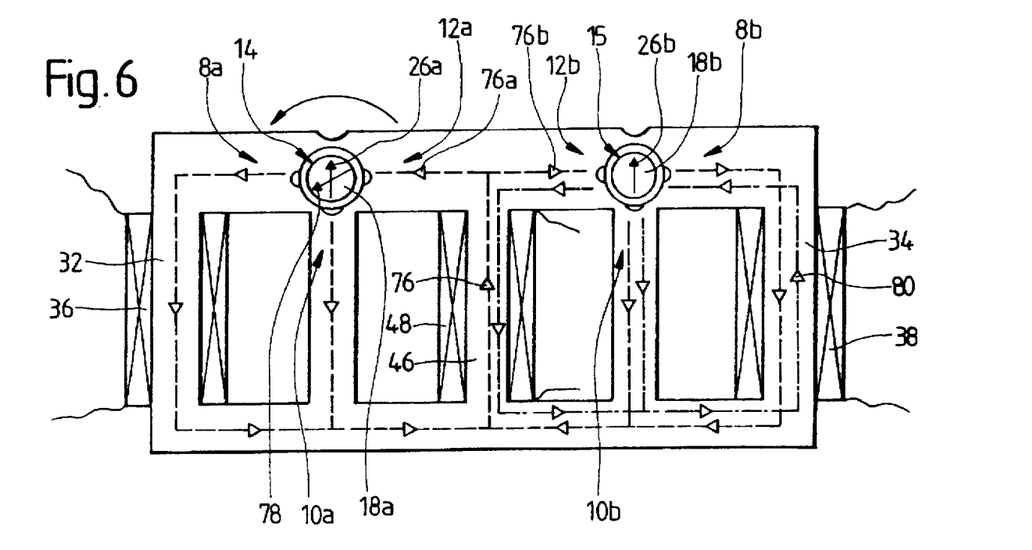
Figure 7:
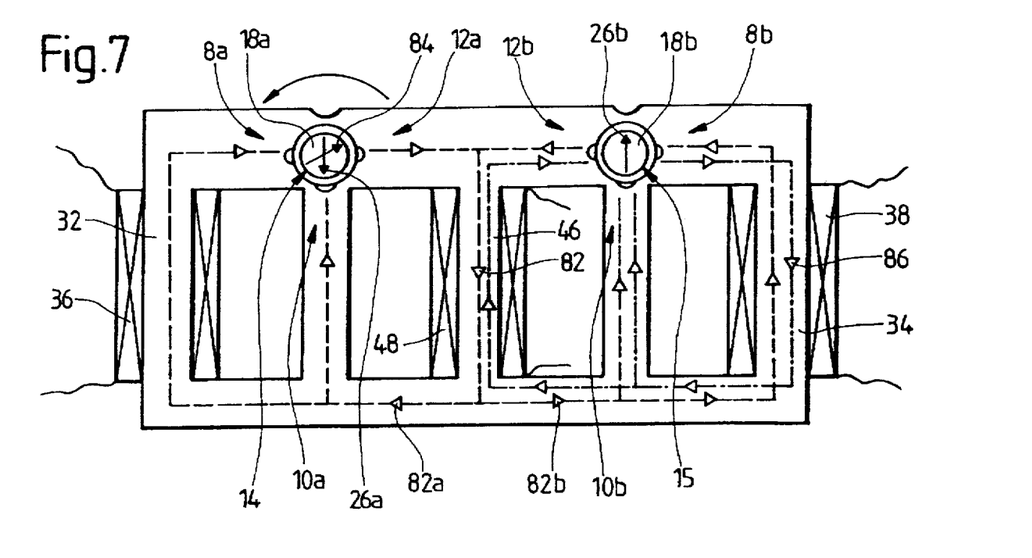

FIGS. 6 and 7 show schematically the control method for driving only rotor 14 in rotation in the positive direction, while leaving rotor 15 in one of its two minimum energy positions.

In order to drive rotor 14 in rotation from the first minimum energy position in which it is shown in FIG. 6 to its second minimum energy position in which it is shown in FIG. 7, coil 48 is supplied with a supply current having a first polarity so as to generate in core 46 carrying this coil 48 a magnetic flow 76.

Magnetic flow 76 generated by coil 48 and exiting core 46 via first end 40 of stator arm 42 (FIG. 1) separates in substantially equal parts into two magnetic flows 76a and 76b respectively propagating in the direction of third stator pole 12a and third stator pole 12b. Thus, permanent magnet 18a of rotor 14 is traversed by a magnetic flow 76a entering via third stator pole 12a and exiting, in substantially equal parts, via first and second stator poles 8a and 10a. The global direction of magnetic flow 76a traversing permanent magnet 18a is represented by arrow 78. This global direction 78 of the magnetic flow traversing permanent magnet 18a provides a torque driving rotor 14 in rotation from its first minimum energy position to its second minimum energy position.

In order to neutralise the effect of magnetic flow 76b on permanent magnet 18b of rotor 15, coil 38 is supplied according to the invention with a supply current whose polarity is chosen so that the direction of magnetic flow 80, generated by this coil 38 in core 34, has a propagation direction in first stator pole 8b opposite to the direction of magnetic flow 76b propagating in this first stator pole 8b. Further, the magnetic potential generated by coil 38 is advantageously equal to half of the magnetic potential generated by coil 48 so that coil 38 exerts on rotor 15 a torque opposite to that generated by coil 48. In the case of current control, it is to be noted that there is proportionality between the magnetic potential and electric current. In the case of voltage control, one can act on the chopping rate of the pulses provided to coil 38 and to coil 48.

It follows from the arrangement of the three stator poles 8b, 10b and 12b and from the angular position of the two minimum energy positions of rotor 15 that the resulting flow in the volume of permanent magnet 18b, generated by magnetic flows 76b and 80, has a direction substantially parallel to the direction of magnetic axis 26b when permanent magnet 18b is in one of its two minimum energy positions. Consequently, the torque exerted on rotor 15 is zero or almost zero and this rotor 15 remains in its initial minimum energy position.

Likewise, in order to drive rotor 14 in rotation in a positive direction from its second minimum energy position in which it is shown in FIG. 7 to its first minimum energy position in which it is shown in FIG. 6, coil 48 is supplied by a supply current having a second polarity opposite to said first polarity. In this case, coil 48 generates in core 46 a magnetic flow 82. This magnetic flow 82 exits polar arm 42 via its second end 44 (FIG. 1) by dividing, in substantially equal parts, into two magnetic flows 82a and 82b.

Magnetic flow 82a penetrates the volume defined by permanent magnet 18a of rotor 14 via first and second stator poles 8a and 10a to exit this volume via third stator pole 12a. The direction of magnetic flow 82a traversing permanent magnet 18a is thus represented by arrow 84. Magnetic flow 82a traversing permanent magnet 18a generates a torque used to drive rotor 14 in rotation from its second minimum energy position to its first minimum energy position.

Again, in order to neutralise the influence of magnetic flow 82b on rotor 15, coil 38 is supplied with a supply current generating in core 34 a magnetic flow 86 which has in said core 34 a propagation direction opposite to the propagation direction of magnetic flow 82b. Consequently, the global direction of the magnetic flow resulting from magnetic flows 82b and 86 traversing permanent magnet 18b is substantially parallel to the direction of magnetic axis 26b of permanent magnet 18b when the latter is in one of its two minimum energy positions. Thus, rotor 15 is not driven in rotation.

Figure 8:
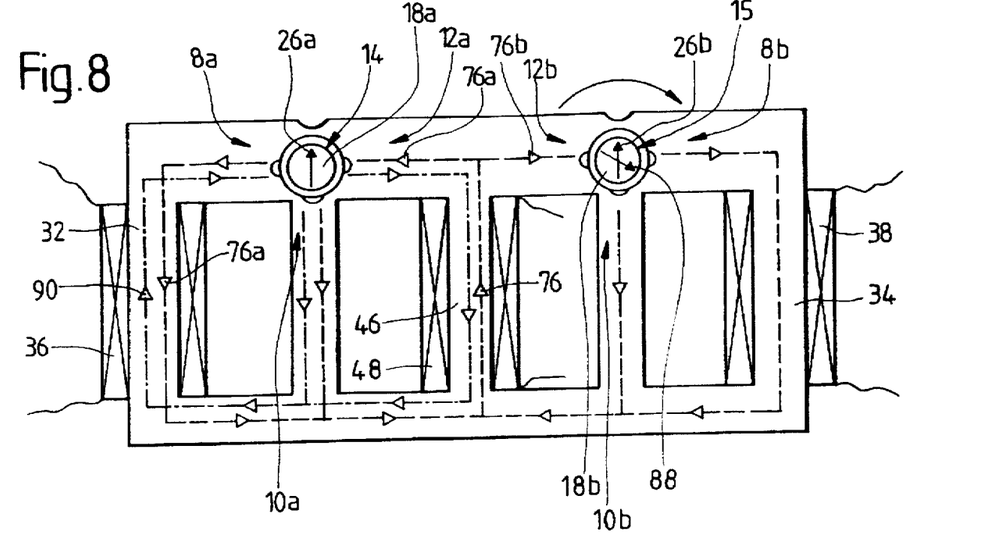
Figure 9:
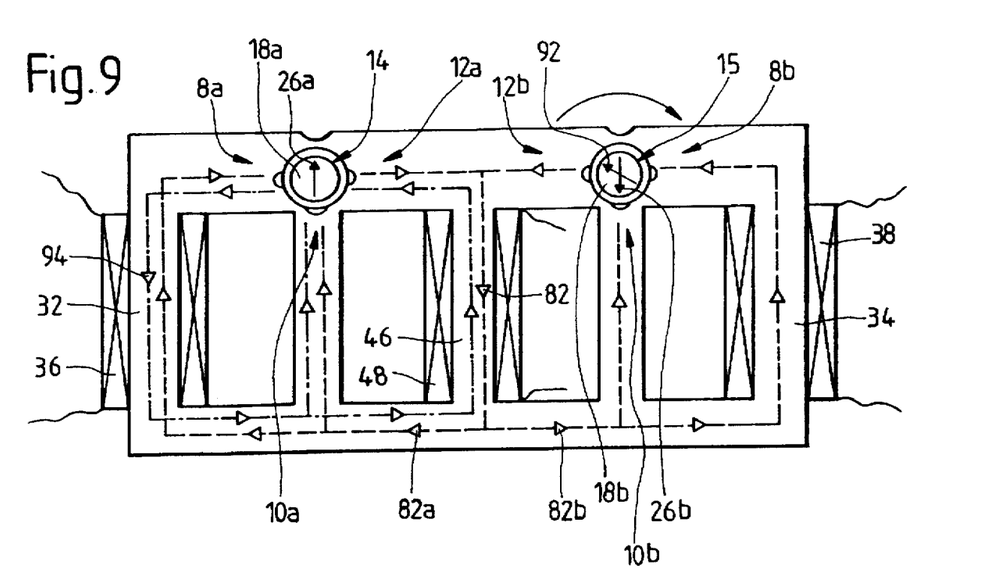

FIGS. 8 and 9 show schematically the control method for driving only rotor 15 in rotation in the negative direction, while leaving rotor 14 in one of its two minimum energy positions.

Given the symmetrical arrangement of the electromechanical transducer according to the invention, the control method shown schematically with the aid of FIGS. 8 and 9 is similar to the control method described above with the aid of FIGS. 6 and 7.

Coil 48 is supplied with a current having a first polarity in order to generate in core 46 a magnetic flow 76 described above, which divides into two magnetic flows 76a and 76b. Magnetic flow 76b penetrates the volume defined by permanent magnet 18b via third stator pole 12b to exit this volume again via first and second stator poles 8b and 10b. The global direction of the magnetic flow traversing permanent magnet 18b is represented in FIG. 8 by arrow 88. The magnetic flow traversing permanent magnet 18b generates a torque used to drive rotor 15 in rotation in the negative direction from its first minimum energy position in which it is shown in FIG. 8 to its second minimum energy position in which it is shown in FIG. 9.

In order to neutralise the influence of magnetic flow 76a acting on permanent magnet 18b of rotor 14, coil 36 is supplied according to the invention so as to generate a magnetic flow 90 in core 32. The direction of magnetic flow 90 propagating in core 32 is the opposite to that of magnetic flow 76a propagating in this core 32. Again, the magnetic potential of coil 36 is chosen so that the intensity of magnetic flow 90 traversing permanent magnet 18a is substantially equal to the intensity of magnetic flow 76a also traversing said permanent magnet 18a. The global direction of the magnetic flow resulting from magnetic flows 76a and 90 and traversing permanent magnet 18a is substantially parallel to the direction of magnetic axis 26a when rotor 14 is in one of its two minimum energy positions. Consequently, rotor 14 is not driven in rotation.

In order to drive rotor 15 in rotation in the negative direction from its second minimum energy position to its first minimum energy position, coil 48 is supplied in such a way that it generates in core 46 a magnetic flow 82 which divides into two magnetic flows 82a and 82b as described previously. Magnetic flow 82b, entering the volume defined by permanent magnet 18b via first and second stator poles 8b and 10b and exiting said volume via third stator pole 12b, has a global propagation direction inside said volume represented by arrow 92. Magnetic flow 82b traversing permanent magnet 18b generates a torque driving rotor 15 in rotation from its second minimum energy position to its first minimum energy position.

In order to neutralise the influence of magnetic flow 82a traversing permanent magnet 18a of rotor 14, coil 36 is supplied so that the latter generates in core 32 a magnetic flow 94 having a propagation direction opposite to the propagation direction of magnetic flow 82a traversing this core 32. Coil 36 is supplied so that the intensity of magnetic flow 94 traversing permanent magnet 18a has an intensity substantially equal to the intensity of magnetic flow 82a traversing said permanent magnet 18a. For the reasons cited previously, no force is exerted on rotor 14 and the latter is not driven in rotation.

The present invention thus enables two rotors to be independently driven in rotation in the two possible rotational directions with the aid of an electromechanical transducer comprising a single stator and only three coils. It is to be noted that it is also possible to drive the two rotors 14 and 15 simultaneously in rotation by an appropriate control within the reach of the man skilled in the art.

Figure 10:
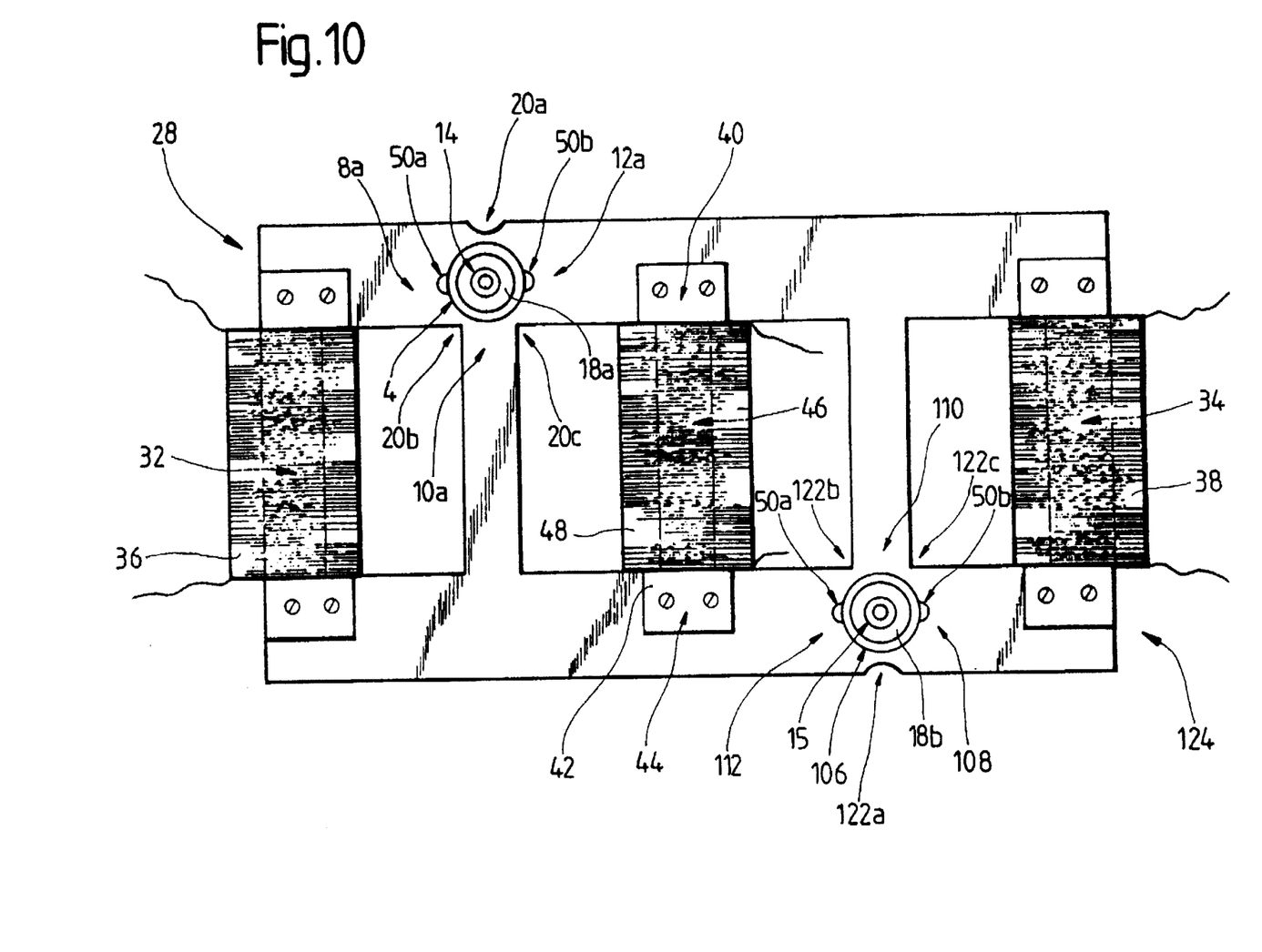

With the aid of FIG. 10, a second embodiment of the invention will be described below.

The references already described in detail during the description of the first embodiment will not be described again here.

This second embodiment differs from the first embodiment in that permanent magnet 18b of second rotor 15 is situated in a stator hole 106, defined by a first stator pole 108, a second stator pole 110 and a third stator pole 112. and in that stator hole 6 of the first embodiment is not provided in this second embodiment.

The three stator poles 108, 110 and 112 are magnetically insulated from each other by areas of high magnetic reluctance forming necks 122a, 122b and 122c.

First stator pole 108 and second stator pole 110 are magnetically coupled to each other by magnetic flow guiding means 124 comprising core 34 around which coil 38 is wound. Third magnetic pole 112 is magnetically coupled to second end 44 of stator arm 42, while first end 40 of said stator arm 42 is magnetically coupled to magnetic flow guiding means 124.

The operation of the transducer according to this second embodiment is similar to that described above in relation to the first embodiment of the invention. However, this second embodiment has an advantage as regards the electrical consumption of the transducer in the case where the latter is used as a direct driving motor for the two hands of a timepiece. This is due to the fact that rotor 14 and rotor 15 can be driven in the conventional clockwise direction (negative direction or opposite of the trigonometric direction) respectively solely by means of supplying respectively coil 36 and 38.

It will be noted however that each of rotors 14 and 15 of the first embodiment and the second embodiment can be controlled in different ways within the reach of the man skilled in the art, in particular by the supply of the three coils 36, 38 and 48.

What is claimed is:

1. Electromechanical transducer comprising:

a stator defining a first stator hole (4) and a second stator hole (6;106); and a first rotor (14) and a second rotor (15) traversing respectively said first and second stator holes, each of said first and second rotors comprising a permanent magnet (18a, 18b) magnetically coupled to said stator:

said electromechanical transducer being characterized in that each of said first and second stator holes is defined by a first stator pole (8a,8b; 108), a second stator pole (10a, 10b; 110) and a third stator pole (12a,12b;112), said first and second stator poles partially defining said first stator hole being magnetically coupled by first means (28) for guiding the magnetic flow, said first and second stator poles partially defining said second stator hole being magnetically coupled by second magnetic flow guiding means (30;124), said first and second magnetic flow guiding means being respectively coupled with first and second magnetic supply means (36,38), said electromechanical transducer also comprising a stator arm (42) of low magnetic reluctance having a first end (40) and a second end (44), said stator arm being coupled with third magnetic supply means (48), said third stator pole (12a) partially defining said first stator hole (4) being magnetically coupled to the first end of said stator arm and said first magnetic flow guiding means (28) being magnetically coupled to the second end of said stator arm, said third stator pole (12b;112) partially defining said second stator hole (6,106) being magnetically coupled to said first or second end of said stator arm and said second magnetic flow guiding means (30:124) being magnetically coupled to the other end of said stator arm;

wherein said first, second and third magnetic supply means so are independent fed with supply current so that said first and second rotors are drivable independently of one another in both clockwise and counterclockwise directions.

2. Electromechanical transducer according to claim 1, characterised in that said permanent magnet (18a,18b) of each of said first and second rotors (14,15) is bipolar with radial magnetisation defining a magnetic axis (26a,26b) of said permanent magnet, said permanent magnets of the first and second rotors being positioned respectively inside said first and second stator holes (4,6;106), and in that positioning notches (50a,50b) are provided on the edges of each of said first and second stator holes defining for said permanent magnet of each of said first and second rotors two minimum energy positions staggered at an angle of 180°.

3. Electromechanical transducer according to claim 2, characterised in that said first, second and third magnetic supply means (36,38,48) are formed respectively by a first coil (36), a second coil (38) and a third coil (48), said first and second magnetic flow guiding means (28,30;124) comprising respectively a first magnetic core (32) and a second magnetic core (34) around which are respectively wound said first and second coils, said stator arm (42) comprising a third magnetic core (46) around which is wound said third coil.

4. Electromechanical transducer according to claim 2, characterised in that, when said permanent magnet (18a, 18b) of one of said first and second rotors is in one of its two minimum energy positions, the direction of said magnetic axis (26a,26b) of this permanent magnet is substantially aligned with the second stator pole (10a,10b;110) partially defining said first or second stator hole (4,6;106) in which this permanent magnet is situated.

5. A method for controlling an electromechanical transducer according to claim 2, characterised in that all that is provided for driving the first rotor (14) in rotation in a first rotational direction, while leaving the second rotor (15) in one of its two minimum energy positions, is only the feeding of said first magnetic supply means (36) with an alternation of polarity of the supply current fed to said first magnetic supply means, and, in a second rotational direction, the feeding of said third magnetic supply means, with an alternation of polarity of the supply current fed to said third magnetic supply means, jointly with the feeding of said second magnetic supply means (48) so that the magnetic flow, resulting from the feeding of said second and third magnetic supply means, has a global propagation direction, inside the volume defined by the permanent magnet (18b) of said second rotor, substantially parallel to the direction of said magnetic axis (26b) of said permanent magnet when the latter is positioned in one of its two minimum energy positions.

* * * * *